Patented Dec. 5, 1939

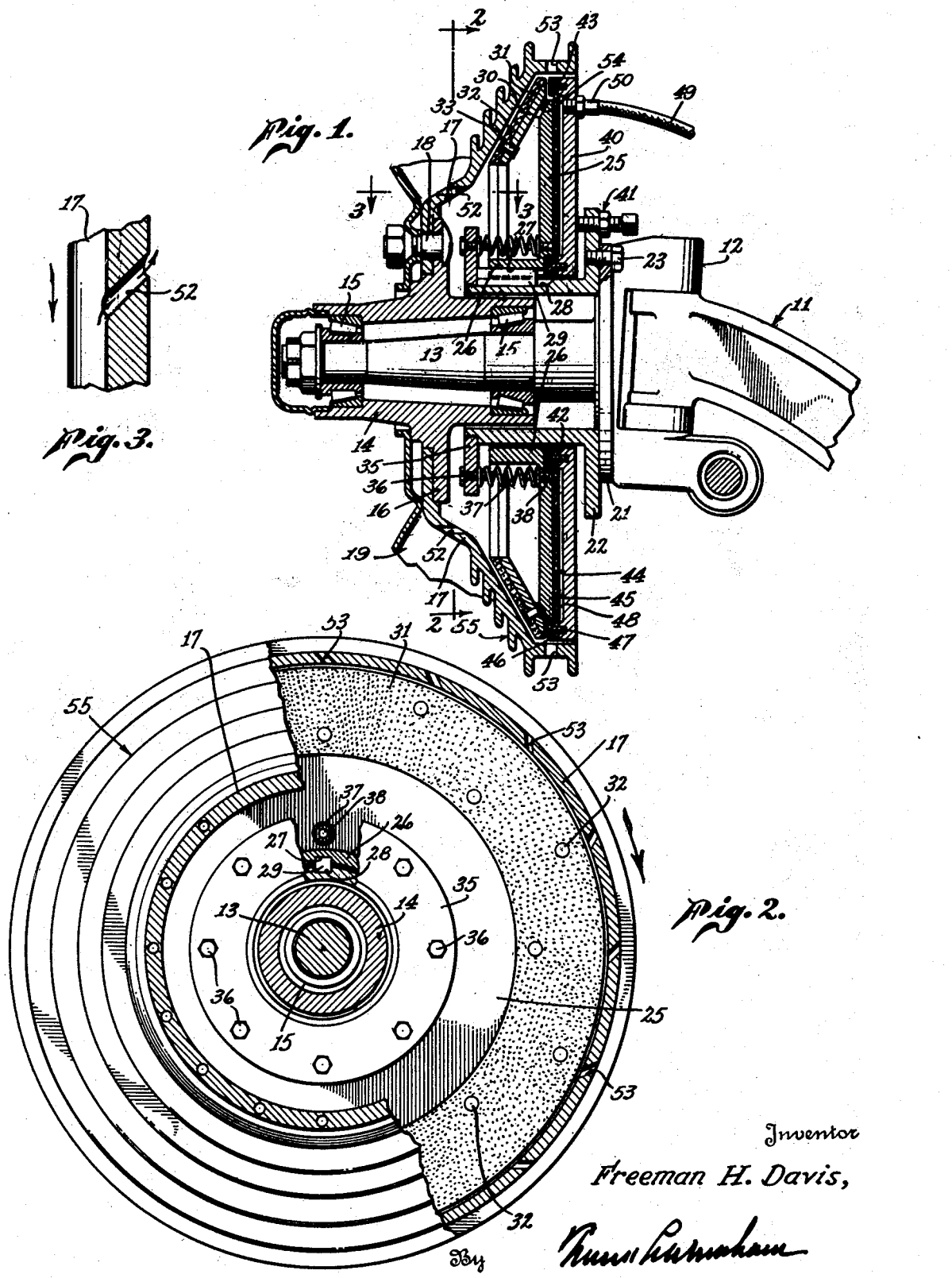

2,181,988

UNITED STATES PATENT OFFICE 2,181,988

BRAKE

Freeman H. Davis, Placentia, Calif., assignor of one-half to Stuart S. McNair, Arcadia, Calif.

Application June 27, 1938, Serial No. 215,963

4 Claims. (Cl. 188—71)

This invention relates generally to brakes and more particularly to fluid operable braking mechanisms. The invention is particularly designed to utilize compressed air as the operating force.

It is a primary object of this invention to provide a brake operable by air pressure which is smooth in its operation and which is of relatively simple construction. In this connection it is an object of this invention to provide a brake of the type indicated which requires only a relatively low fluid pressure for operation.

It is a further object of this invention to provide a brake of the type indicated having a high braking efficiency and having long wearing qualities. More particularly, it is an object to provide a brake having a brake shoe which is flexibly mounted and adapted to compensate for tilting of the brake drum from its proper axis of rotation.

It is also an object of this invention to provide a fluid operable brake which embodies a circular brake shoe engageable with a brake drum and which is so constructed that there will be no tendency for the brake shoe to bind with the brake drum.

It is a still further object of this invention to provide a brake of the type indicated which includes means for positively air cooling the brake drum and the brake shoe. These and other objects will be apparent from the drawing and the following description thereof.

Referring to the drawing which is for illustrative purposes only,

Fig. 1 is a sectional elevation of the brake of this invention;

Fig. 2 is a sectional elevation on line 2—2 of Fig. 1, the drum and other parts being partly broken away; and Fig. 3 is an enlarged detail section on line 3—3 of Fig. 2.

More particularly describing the invention, reference numeral 11 generally indicates a front axle on which is mounted a steering knuckle 12 having a spindle 13 extending therefrom. Mounted on the spindle is a wheel hub 14, suitable bearings 15 being interposed between the spindle and the hub. The hub is provided with a flange 16 for the purpose of mounting a brake drum 17 thereon by means of suitable bolts 18. The wheel associated with the braking mechanism may also be mounted by means of the same bolts 18 and a portion of the wheel has been shown at 19.

The steering knuckle 12 is provided with a flanged portion 21 for the purpose of mounting a flanged sleeve 22 thereon by means of suitable bolts 23. The flanged sleeve 22 is a stationary member adapted to act as a support for the brake shoe and back plate later to be described. Although the brake is shown and described in connection with a steering knuckle and spindle of the type ordinarily used upon the front ends of automobiles, it is not intended to limit the use of the brake thereby as it is contemplated that the brake may be used in connection with the rear wheels and axles of vehicles and may also be used in connection with various other types of machinery.

An annular brake shoe 25 is provided having an inner annular hub portion 26 which is adapted to be relatively loosely fitted upon the flanged sleeve 22. By "loosely fitted" is meant that the bore of the hub 26 is greater than is necessary to secure an easily slidable fit on the sleeve. The clearance has been slightly exaggerated in the drawing for purpose of illustration. The brake shoe is provided with a groove at 27 and the flanged sleeve is correspondingly grooved at 28 so that the two may be keyed together by means of the key 29 and thereby prevent rotation of the brake shoe when in contact with the rotating brake drum.

The outer portion of the brake shoe 25 is provided with an angularly disposed braking portion 30 which is adapted to have mounted thereon a brake lining 31 as by means of the rivets 32. The brake lining 31 is adapted to engage the correspondingly angled surface 33 of the brake drum when the brake shoe is forced into engagement with the drum as will subsequently be described.

For the purpose of yieldably holding the brake shoe out of engagement with the brake drum, the flanged sleeve 22 is threaded at its inner end to accommodate a spring retaining ring 35. This ring is provided with bolts 36 which extend inwardly of its inner face and act as supports for compression springs 37 which are interposed between the inner surface of the plate 35 and the brake shoe 25, being retained in place on the brake shoe by means of studs 38 mounted therein.

The brake shoe 25 is adapted to be forced into engagement with the brake drum 17 by means of fluid pressure, preferably compressed air. Accordingly, there is provided a back plate 40 which is slidably mounted on the flanged sleeve 22 and is held in an adjusted position relative to the flanged portion thereof by means of adjustment bolt and nut assemblies generally indicated by reference numeral 41. The back plate is also loosely fitted upon the sleeve. The back plate is provided with an inner and outer annular ridge or land indicated respectively at 42 and 43 forming an annular depressed portion 44. A flexible and expansible diaphragm 45 is mounted on the ridges 42 and 43 in spaced relation to the inner surface or depressed portion 44 of the plate 40. Diaphragm 45 is mounted on the plate 40 by means of the rings 46 and screws 47 and is adjacent to the brake shoe. The back plate 40 and the diaphragm 45 cooperate to form what will be termed a pressure chamber 48 which is adapted to be supplied with compressed air by means of the conduit 49 and fitting 50.

The conduit 49 may lead to any suitable source of compressed air or other gaseous fluid. It is contemplated that the conduit 49 act as both an inlet and outlet conduit for the supply and release of the pressure fluid to and from chamber 48.

In the operation of the device admittance of pressure fluid into the chamber 48 (which may be accomplished in any suitable manner) forces the flexible and expansible diaphragm 45 into pressure contact with the rear surface of the brake shoe 25 and further movement of the diaphragm forces the brake shoe toward the brake drum until the brake lining 31 engages the braking surface 33 of the rotatable drum 17. The springs 37 serve to release the brake when pressure is released from chamber 48. Preferably the hub portion 26 of the shoe 25 is loosely fitted on the flanged sleeve 22 with more than ordinary clearance as above described in order that the shoe may accommodate itself to the brake drum 17 in the event the drum should tilt with respect to its normal axis of rotation.

It was pointed out as one of the objects of this invention to provide a brake having means for air cooling the braking members and to carry out this object the brake drum is apertured at 52 to provide air inlet passages. These apertures 52 are diagonally disposed (see Fig. 3) so that the outer end of the aperture partially faces the normal direction of rotation of the wheel, thereby tending to cause air to flow inwardly through the aperture as indicated. The periphery of the brake drum is provided with apertures 53 which are disposed diagonally with respect to radial lines as shown in Fig. 2 so that they will tend to draw air outwardly from the interior of the drum. When the brake shoe is in engagement with the braking surface 33 of the drum there is a circulation of air inwardly through apertures 52 and upwardly across surface 33 of the drum and outwardly through apertures 53. So that there will be a circulation of air when the brake shoe engages the brake drum, the shoe is provided with the apertures 54 which permit circulation of the air inwardly through apertures 52 across the rear surface of the angularly disposed braking portion 30 of the brake shoe, through apertures 54 and outwardly from the brake drum through apertures 53. The brake drum may also be provided with cooling fins 55.

So as to prevent binding of the brake shoe with the brake drum, the braking surface 33 of the drum is disposed at an angle of between 45 and 90 degrees with relation to the axis of rotation of the drum. The portion of the brake shoe adapted to engage the braking surface of the drum is correspondingly disposed. Preferably the angle of disposition of the braking surface should be approximately 60 degrees with relation to the axis of rotation of the drum. When the braking surfaces of the drum and shoe are disposed as disclosed herein there is no tendency for the shoe to bind or grab the drum. If the braking surfaces are disposed at less than 45 degrees to the axis of rotation of the drum a severe wedging action results as the conically disposed brake shoe braking surface is forced into engagement with the drum with the result that the parts will tend to bind, that is, the shoe will tend to grab and lock the drum.

It should be apparent from the above description that the brake of this invention is easily operable with a minimum amount of fluid pressure due to the large area of the flexible diaphragm which is adapted to be distorted into engagement with the brake shoe to force that member into braking relation with the drum. The brake is particularly designed to utilize compressed air and when such pressure fluid is used in the brake, a smooth acting brake is achieved by reason of the inherent compressibility of the air. However, it is contemplated that if desirable, other fluids, including liquids, might be used for the operation of the brake.

Although the invention has been particularly shown and described, it is not intended to limit the invention to the form shown and it is intended to cover such changes as come within the scope of the claims.

I claim as my invention:

1. In a fluid pressure brake: a rotatable brake drum; a supporting member; a flanged sleeve mounted on said supporting member; an annular brake shoe slidably mounted on said sleeve; a spring retaining ring mounted on the inner end of said flanged sleeve; spring means interposed between said ring and said brake shoe for yieldably holding said shoe out of engagement with said drum; an annular back plate mounted on said flanged sleeve, said back plate having an annular depressed portion on its inner surface; a flexible and expansible diaphragm mounted on said back plate and covering said depressed portion to form a pressure chamber; and means for connecting said pressure chamber to a source of pressure fluid; said diaphragm being adapted to be distorted by the action of a pressure fluid in said pressure chamber to engage said brake shoe to force same into engagement with said brake drum.

2. In a fluid pressure brake; a rotatable brake drum; a supporting member; a flanged sleeve mounted on said supporting member; a brake shoe slidably mounted on said sleeve, said shoe comprising an annular plate having a central hub and having an inwardly angled drum engaging portion; a spring retaining ring mounted on the inner end of said flanged sleeve; spring means interposed between said ring and said shoe for yieldably holding said shoe out of engagement with said drum; an annular back plate mounted on said flanged sleeve, said back plate having an annular depressed portion on its inner surface; a flexible expansible diaphragm mounted on said back plate and covering said depressed portion to form a pressure chamber, said diaphragm being adjacent to said shoe; adjustment means associated with the flanged portion of said sleeve for adjusting said back plate and thereby adjusting said shoe with relation to said drum; and means for connecting said pressure chamber to a source of pressure fluid; said diaphragm being adapted to be distorted by the action of a pressure fluid in said pressure chamber to engage said brake shoe to force same into engagement with said drum.

3. In a fluid pressure brake; a rotatable brake drum; a supporting means; a brake shoe slidably mounted on said supporting means; a back plate; a flexible diaphragm mounted on said back plate adjacent said brake shoe and cooperating with said back plate to form a pressure chamber; means for connecting said pressure chamber to a source of pressure fluid; said diaphragm being adapted to be distorted by the action of a pressure fluid in said pressure chamber to engage said brake shoe and force same into engagement with said brake drum; and means for cooling said brake comprising holes circularly arranged in said drum inwardly of the braking surface thereof, said holes being angularly disposed to entrap air when said drum is rotated, and holes circularly arranged in said drum outwardly of the braking surface, said holes being angularly disposed to draw air out of said drum when said drum is rotated.

4. In a fluid pressure brake; a rotatable brake drum; a supporting member; a sleeve mounted on said supporting member; an annular brake shoe slidably mounted on said sleeve; a spring supporting means mounted on the inner end of said sleeve; spring means interposed between said supporting means and said brake shoe for slidably holding said shoe out of engagement with said drum; an annular back plate mounted on said sleeve; said back plate having an annular depressed portion on its inner surface; abutment means on said sleeve for limiting outward movement of said back plate; a flexible and extensible diaphragm mounted on said back plate and covering said depressed portion to form a pressure chamber; and means for connecting said pressure chamber to a source of pressure fluid; said diaphragm being adapted to be distorted by the action of a pressure fluid in said pressure chamber to engage said brake shoe to force same into engagement with said brake drum.

FREEMAN H. DAVIS.